(12) United States Patent
Sudak et al.

(10) Patent No.: US 8,570,964 B2
(45) Date of Patent: Oct. 29, 2013

(54) DEVICE, SYSTEM, AND METHOD OF COORDINATING AMONG MULTIPLE CO-LOCATED WIRELESS COMMUNICATION UNITS

(75) Inventors: Eran Sudak, Tel Aviv (IL); Ofer Markovits, Haifa (IL); Ran Mor, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 318 days.

(21) Appl. No.: 12/945,939

(22) Filed: Nov. 15, 2010

(65) Prior Publication Data

US 2012/0120857 A1 May 17, 2012

(51) Int. Cl.
*H04W 74/00* (2009.01)
(52) U.S. Cl.
USPC ............................ 370/329; 370/337; 370/347
(58) Field of Classification Search
None
See application file for complete search history.

(56) References Cited

U.S. PATENT DOCUMENTS

| | | | | |
|---|---|---|---|---|
| 2004/0048572 | A1* | 3/2004 | Godfrey | 455/41.2 |
| 2006/0205363 | A1* | 9/2006 | Godfrey | 455/83 |
| 2006/0239223 | A1* | 10/2006 | Sherman et al. | 370/329 |
| 2006/0292986 | A1* | 12/2006 | Bitran et al. | 455/41.2 |
| 2007/0281617 | A1* | 12/2007 | Meylan et al. | 455/41.2 |
| 2009/0285167 | A1 | 11/2009 | Hirsch et al. | |

OTHER PUBLICATIONS

IEEE Standard for Information technology—Telecommunications and information exchange between systems—Local and metropolitan area networks—Specific requirements Part 11: Wireless LAN Medium Access Control (MAC) and Physical Layer (PHY) Specifications; IEEE Std 802.11™-2007 (Revision of IEEE Std 802.11-1999).
Specification of the Bluetooth System, version: 1.2, Nov. 5, 2003.
International Search Report and Written Opinion Received for PCT Patent Application No. PCT/US2011/058825, Mailed on May 23, 2012, 9 pages.

* cited by examiner

*Primary Examiner* — Robert Scheibel
(74) *Attorney, Agent, or Firm* — Shichrur & Co.

(57) ABSTRACT

Device, system, and method of coordinating among multiple collocated wireless communication units. For example, a wireless communication device may include a first wireless communication unit to communicate with an access point of a first wireless communication network; and a second wireless communication unit to communicate in a second wireless communication network, wherein the first wireless communication unit is to determine at least one contention-free period, during which the second wireless communication unit is expected not to communicate in the second wireless communication network, and wherein, during the contention-free period, the first wireless communication unit is to transmit to the access point at least one request to transmit one or more pending transmissions to the first wireless communication unit. Other embodiments are described and claimed.

19 Claims, 5 Drawing Sheets

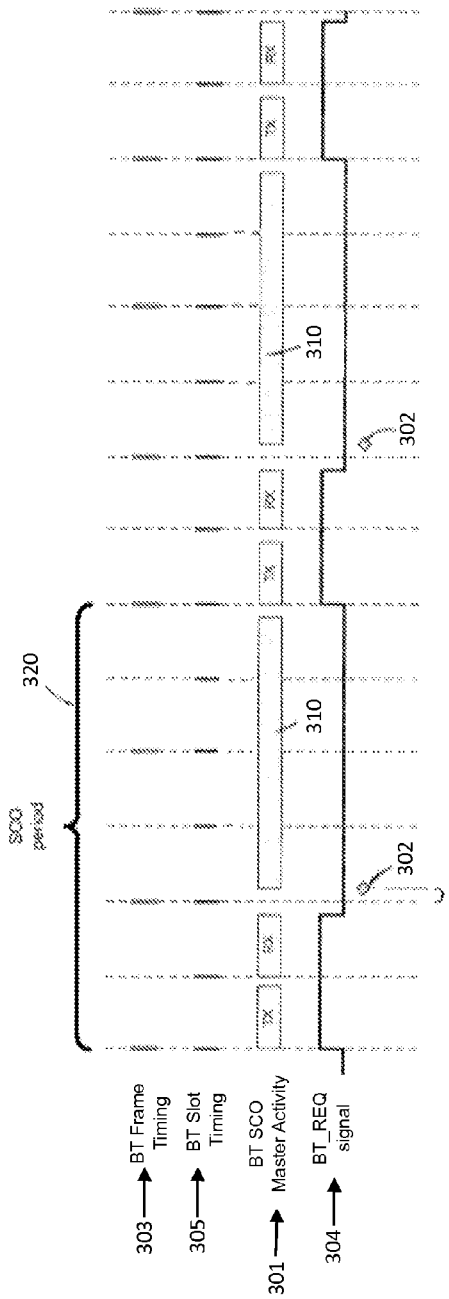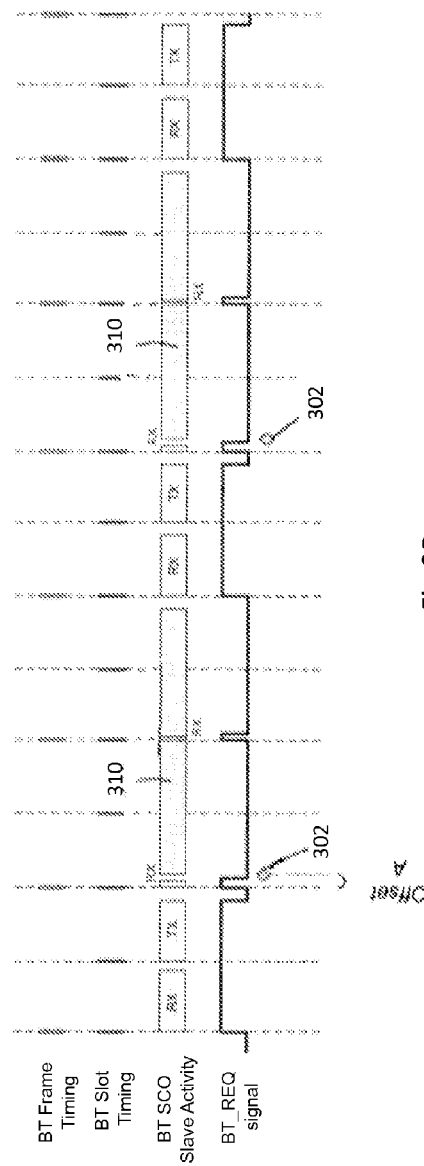
Fig 3A
Fig 3B

DEVICE, SYSTEM, AND METHOD OF COORDINATING AMONG MULTIPLE CO-LOCATED WIRELESS COMMUNICATION UNITS

BACKGROUND

In the field of wireless communications, a wireless communication device may include multiple wireless transceivers, for example, a first wireless transceiver able to operate in accordance with a first wireless communication standard or protocol, and a second transceiver able to operate in accordance with a second wireless communication standard or protocol.

Transmission or reception of wireless communication signals by the first transceiver may interfere with concurrent communication by the second transceiver.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIGS. 3A and 3B schematically illustrate a synchronization anchor point determined with respect to a BT master activity and a BT slave activity, respectively, in accordance with some demonstrative embodiments.

DETAILED DESCRIPTION

Figure 1:
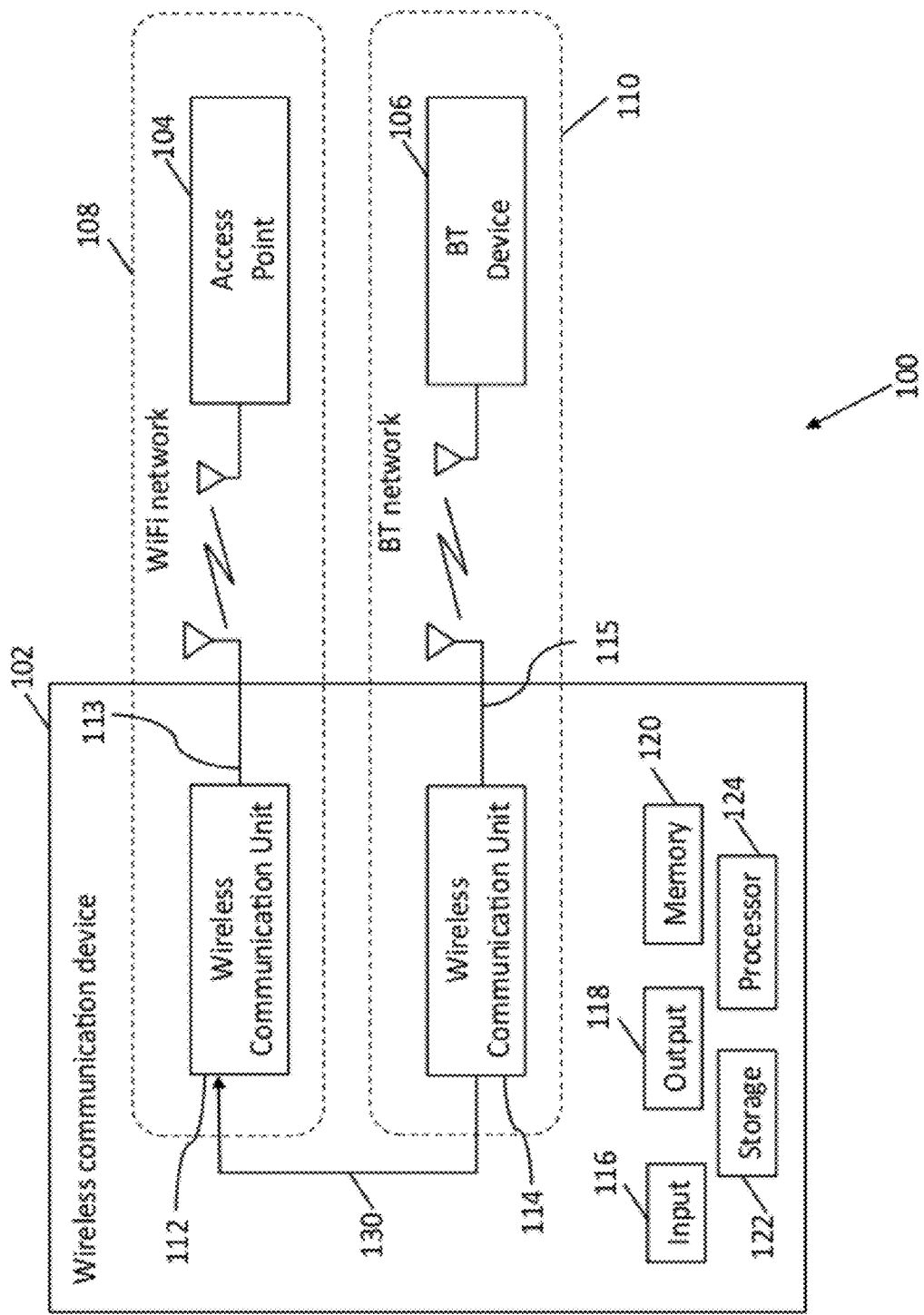
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing IEEE 802.11 standards (*IEEE 802.11-2007, IEEE Standard for Information Technology—Telecommunications and information exchange between systems—Local and metropolitan area networks—Specific requirements*, Part 11: *Wireless LAN Medium Access Control (MAC) and Physical Layer (PHY) Specifications*) and/or future versions and/or derivatives thereof, devices and/or networks operating in accordance with existing IEEE 802.16 standards (*IEEE-Std 802.16, 2009 Edition, Air Interface for Fixed Broadband Wireless Access Systems*) and/or future versions and/or derivatives thereof, devices and/or networks operating in accordance with existing Bluetooth specifications (*Bluetooth Specification* V.1.0, Dec. 1, 1999), devices and/or networks operating in accordance with existing WirelessHD™ and/or Wireless-Gigabit-Alliance (WGA) specifications and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service.

The term "power-save mode" as used herein may include, for example, an idle mode, a standby mode, a power conservation mode, a reduced power mode, an efficiency mode, a "sleep" mode, a semi-operational mode, a semi-active mode, a partially-active mode, or other modes of operations in which a component (e.g., a transceiver or a sub-unit thereof) is not fully operational and/or active.

Although portions of the discussion herein may relate, for demonstrative purposes, to a first transceiver able to operate in accordance with the IEEE 802.11 standards, or a derivative thereof, and a second transceiver able to operate in accordance with the Bluetooth specifications, or a derivative thereof, other embodiments may be used in accordance with various other types of transceivers and/or combinations thereof.

Some demonstrative embodiments may be used in conjunction with suitable limited-range or short-range wireless communication networks, for example, "piconets", e.g., a wireless area network, a WVAN, a WPAN, and the like.

Reference is now made to FIG. 1, which schematically illustrates a block diagram of a system 100 in accordance with some demonstrative embodiments.

In some demonstrative embodiments, one or more nodes of system 100 may be capable of communicating content over one or more suitable wireless communication links, for example, a radio channel, an IR channel, a RF channel, a Wireless Fidelity (WiFi) channel, a Bluetooth (BT) channel, and the like. One or more nodes of system 100 may optionally be capable of communicating over any suitable wired communication links.

In some demonstrative embodiments, system 100 may include one or more wireless communication devices, for example, a wireless communication device 102.

In some demonstrative embodiments, wireless communication device 102 may be capable of communicating as part of at least a first wireless communication network 108, operating in accordance with a first wireless communication protocol or standard; and a second wireless communication network 110 operating in accordance with a second wireless communication protocol or standard.

In some demonstrative embodiments, wireless communication network 108 may include any suitable WiFi network. For example, wireless communication network 108 may include a WLAN operating in accordance with the IEEE 802.11 standards.

In some demonstrative embodiments, wireless communication network 110 may include any suitable BT network, e.g., a WPAN operating in accordance with the BT specification.

In some demonstrative embodiments, wireless communication device 102 may include a first wireless communication unit 112 capable of communicating over wireless communication network 108. For example, wireless communication unit 112 may be capable of communicating with an Access Point (AP) 104 of wireless communication network 108, e.g., in accordance with the IEEE 802.11 standards.

In some demonstrative embodiments, wireless communication device 102 may include a second wireless communication unit 114 capable of communicating over wireless communication network 110. For example, wireless communication unit 114 may be capable of communicating with a BT device 106 of wireless communication network 110, e.g., in accordance with the BT specifications.

In some demonstrative embodiments, wireless communication units 112 and 114 may be implemented as separate elements of wireless communication device 102, e.g., in the form of multiple transceivers collocated in wireless communication device 102. Wireless communication units 112 and/or 114 include, for example, one or more wireless transmitters, receivers and/or transceivers able to send and/or receive wireless communication signals, RF signals, frames, blocks, transmission streams, packets, messages, data items, and/or data. For example, communication units 112 and/or 114 may include or may be implemented as part of a wireless Network Interface Card (NIC), and the like.

Wireless communication units 112 and/or 114 may include, or may be associated with, one or more antennas or one or more sets of antennas 113 and/or 115, respectively. Antennas 113 and/or 115 may include, for example, an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

In some demonstrative embodiments, wireless communication device 102 may include, for example, a video device, a WiDi device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, an audio amplifier, a data source, a data sink, a DSC, a media player, a Smartphone, a television, a music player, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, or the like.

In some demonstrative embodiments, wireless communication device 102 may also include, for example, one or more of a processor 124, an input unit 116, an output unit 118, a memory unit 120, and a storage unit 122. Wireless communication device 102 may optionally include other suitable hardware components and/or software components. In some embodiments, some or all of the components of device 102 may be enclosed in a common housing or packaging, and may be interconnected or operably associated using one or more wired or wireless links. In other embodiments, components of device 102 may be distributed among multiple or separate devices or locations.

Processor 124 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 124 executes instructions, for example, of an Operating System (OS) of device 102; and/or of one or more suitable applications.

Input unit 116 includes, for example, a keyboard, a keypad, a mouse, a touch-pad, a track-ball, a stylus, a microphone, or other suitable pointing device or input device. Output unit 118 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, store data processed by device 102.

In some demonstrative embodiments, communication over wireless communication network 110 may interfere with communication over wireless communication network 108.

In one example, wireless communication units 112 and 114 may operate in at least partially overlapping frequency bands. In one example, wireless communication units 112 and 114 may both operate in the 2.4 Gigahertz (GHz) Industrial, Scientific and Medical (ISM) band. In other embodiments, wireless communication units 112 and 114 may operate in any other suitable, fully-overlapping, partially-overlapping or non-overlapping, frequency bands.

In another example, reduced antenna isolation between antennas 113 and 115, for example, antenna isolation less than 35 decibel (dB), may result in interference and/or collisions between transmissions over wireless communication networks 108 and 110. For example, one or more of antennas 113 and 115 may be shared by wireless communication units 112 and 114.

In some demonstrative embodiments, a WiFi device operating over wireless communication network 108, e.g., wireless communication unit 112 and/or AP 104, may have no prior knowledge of impending BT activities over wireless communication network 110. As a result, the WiFi device may be required to attempt and communicate over network 108, e.g., in an opportunistic manner.

In some demonstrative embodiments, communication of wireless communication unit 112 over wireless communication network 108 may be interrupted by communications over wireless communication network 110. As a result, a transmission by wireless communication unit 112 may be aborted, or a reception of a transmission by wireless communication unit 112 may be lost. The interruption to the communication of wireless communication unit 112 over wireless communication network 108 may be severe, for example, for periodic BT traffic, e.g., according to a Hands-Free-Profile (HFP) over a Synchronous connection oriented (SCO) link or according to an Advanced Audio Distribution Profile (A2DP) over an Asynchronous Connectionless (ACL) link.

In some demonstrative embodiments, frequent interruptions to transmissions from AP 104 to wireless communication unit 112 may result in an increased level of lost packets from AP 104 to wireless communication unit 112, e.g., since wireless communication unit 112 may not acknowledge receipt of the transmissions from AP 104. This increased level of lost packets may result in a "death spiral" effect, in which AP 104 may reduce a transmission rate for communicating with wireless communication unit 112, e.g., in order to cope with supposedly bad link conditions; the reduced transmission rate may require AP 104 to transmit longer packets, which may result in a further increase in the lost packets not acknowledged by wireless communication unit 112 due to interference from the BT communication over network 110. Such a "death spiral" may lead to a deadlock, in which AP 104 may utilize a lowest available transmission rate, while wireless communication unit 112 may not be able to properly receive any transmission from AP 104.

In some demonstrative embodiments, wireless communication unit 112 may be capable of causing AP 104 to perform transmissions to wireless communication unit 112 during one or more time periods, which may be synchronized, for example, with a communication activity, e.g., of wireless communication unit 114, over wireless communication network 110.

In some demonstrative embodiments, wireless communication unit 112 may determine at least one time period ("the contention-free period"), during which wireless communication unit 114 is expected not to communicate in wireless communication network 110, e.g., as described in detail below.

In some demonstrative embodiments, wireless communication unit 112 may transmit during the contention-free period at least one request to AP 104 to transmit one or more pending transmissions to wireless communication unit 112, e.g., as described in detail below.

In some demonstrative embodiments, wireless communication unit 112 may utilize a suitable power-save mechanism for communication with AP 104. For example, wireless communication unit 112 may utilize a power-saving mechanism in accordance with the IEEE 802.11 standards.

According to the IEEE 802.11 standards, a wireless communication device (node) may inform an AP that the node is switching to a Power-Save (PS) mode, and the AP may begin buffering packets that are addressed for the node. The AP may periodically send beacons including information indicating to nodes, which are in the PS mode, whether or not there are buffered packets for these nodes or not. According to the IEEE 802.11 standards, if a node learns from the information that the AP has buffered packets for it, the node may transmit a PowerSave Polling (PS-Poll) frame to the AP. In response, the AP may transmit to the node one or more buffered data packets intended for the node.

In some demonstrative embodiments, wireless communication unit 112 may utilize the power-saving mechanism in order to control and/or regulate transmissions from AP 104 to wireless communication unit 112 based on the activity of wireless communication unit 114, e.g., as described below.

In some demonstrative embodiments, wireless communication unit 112 may indicate to AP 104 a power-save mode, e.g., in accordance with the IEEE 802.11 standards. As a result, AP 104 may buffer transmissions intended for wireless communication unit 112. Wireless communication unit 112 may cause AP 104 to transmit the buffered transmissions to wireless communication unit 112 during the contention-free period. For example, wireless communication unit 112 may cause AP 104 to transmit the buffered transmissions by transmitting to AP 104 at least one PS-Poll frame during the contention-free period.

In some demonstrative embodiments, wireless communication unit 112 may detect a frame period corresponding to a transmission of a frame in wireless communication network 110, and determine the contention-free period to be within the frame period. For example, wireless communication unit 112 may determine the contention-free period is to begin a predefined time period after a beginning of the frame period and/or to determine the contention-free period is to end at an end of the frame period or a predefined time period prior to an end of the frame period, e.g., as described below.

In some demonstrative embodiments, wireless communication unit 112 may synchronize the at least one contention-free period to an expected activity pattern of wireless communication unit 114 in wireless communication network 110.

In some demonstrative embodiments, a length of the contention-free period may be greater than a length of the frame period corresponding to the transmission of a frame in wireless communication network 110. For example, the length of the contention-free period may be at least double the length of the frame period, e.g., as described below.

In some demonstrative embodiments, wireless communication unit 114 may be capable of providing a signal 130 indicative of a communication activity over wireless communication network 110. Signal 130 may include, for example, a Bluetooth-request (BT_REQ) signal, which may be asserted, for example, in alignment with a BT slot boundary, e.g., as defined by the BT specifications. For example, signal 130 may remain asserted for an entire BT upcoming activity, e.g., a slot, a frame, a combination of receive/transmit (RX/TX) slots or a combination of TX/RX slots. Signal 130 may be de-asserted (dropped) between consecutive frames and/or slots. In another example, wireless communication unit 114 may act as a "slave", e.g., as defined by the Bluetooth specification, and wireless communication unit 114 may assert signal 130 to request medium access; and, if no incoming packet is received during a predefined timeout period, wireless communication unit 114 may de-assert signal 130, e.g., until a next RX slot. According to this example, wireless communication unit 114 may not perform activity over network 110 until a next BT scheduled activity, e.g., during a total time period equal to almost at least two BT slots, excluding a time spent for the attempt to detect an incoming packet.

In some demonstrative embodiments, wireless communication unit 112 may determine the contention-free time period based on signal 130, e.g., as described below.

In some demonstrative embodiments, determining the contention-free time period based on signal 130 may allow wireless communication unit 112 to cause AP 104 to transmit transmissions to wireless communication unit 112 in synchronization with time periods, which are likely to be contention free in wireless communication network 110. Such synchronization may reduce the chances of transmissions from AP 104 to wireless communication unit 112 being aborted due to interference from communication over wireless communication network 110.

In some demonstrative embodiments, wireless communication unit 112 may synchronize the contention free period with respect to a frame period (the "BT frame period") corresponding to a transmission of a frame ("the BT frame") in wireless communication network 110. For example, wireless communication unit 112 may detect a beginning of the BT frame. Wireless communication unit 112 may detect the beginning of the BT frame, for example, based on signal 130, e.g., upon detection of a rising edge of the BT_REQ signal 130.

In some demonstrative embodiments, wireless communication unit 112 may determine an anchor point, which may be offset from the beginning of the BT frame by a predefined offset period ("offset A"). The size of offset A may be defined, for example, to account for the possibility, that the rising edge of the BT_REQ signal 130 corresponds to a BT slave frame not followed by an incoming RX frame, e.g., as described below.

In some demonstrative embodiments, wireless communication unit 112 may observe a momentary level of signal 130, e.g., at the anchor point. A de-asserted level of signal 130 at the anchor point may indicate that the remainder of the BT frame period may be expected to be free of BT communication, e.g., by wireless communication unit 114.

In some demonstrative embodiments, wireless communication unit 112 may determine the contention-free period to begin at the anchor point, for example, if the momentary level of signal 130 is de-asserted at the anchor point.

In some demonstrative embodiments, wireless communication unit 112 may set the anchor point periodically, for example, at a distance of a BT frame, e.g., such that a succeeding contention-free period will begin the offset A after the beginning of a succeeding BT frame.

Figure 2A:
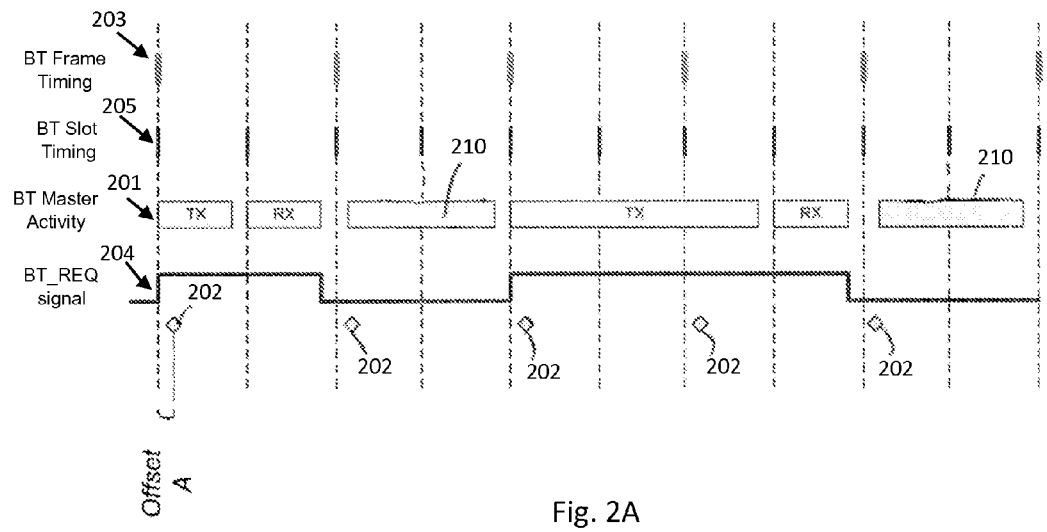
FIGS. 2A and 2B schematically illustrate a synchronization anchor point determined with respect to a Bluetooth (BT) master activity and a BT slave activity, respectively, in accordance with some demonstrative embodiments.
Figure 2B:
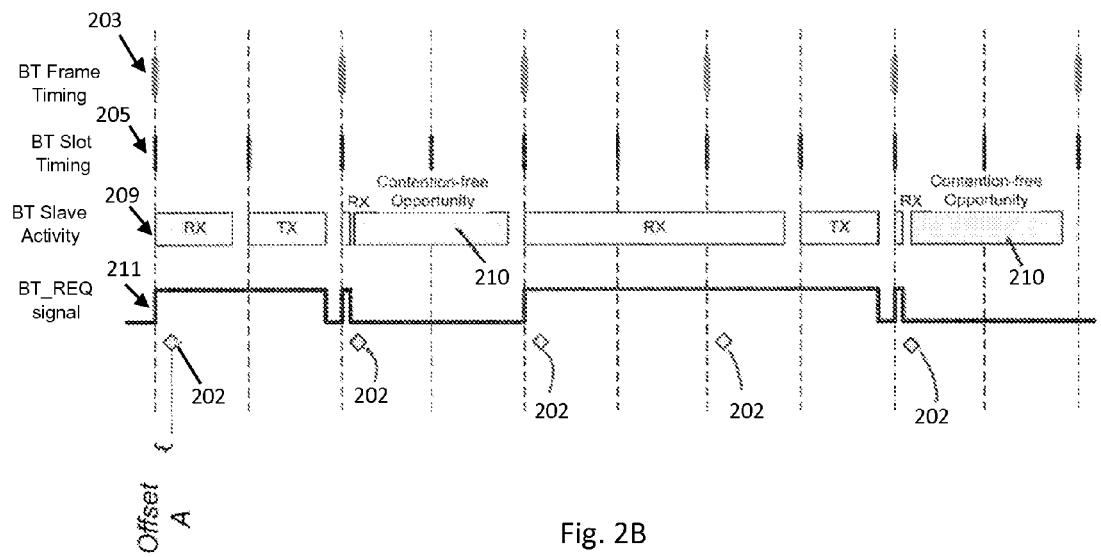

FIGS. 2A and 2B schematically illustrate a synchronization anchor point 202 determined with respect to a BT master activity 201 and a BT slave activity 209, respectively, in accordance with some demonstrative embodiments.

As shown in FIGS. 2A and 2B, BT master activity 201 and the BT slave activity 209 may be performed according to a BT frame timing 203, which may define a BT slot timing 205.

As shown in FIGS. 2A and 2B, a wireless communication unit, e.g., wireless communication unit 114 (FIG. 1), may provide a BT_REQ signal 204 (FIG. 2A) corresponding to the activity of BT master activity 201 or a BT_REQ signal 211 (FIG. 2B) corresponding to the activity of BT slave activity 209. For example, as shown in FIGS. 2A and 2B, the BT_REQ signals 204 and 209 may be asserted when the BT activities 201 and 209, respectively, include a transmission or a reception activity, and de-asserted when the BT activities 201 and 209, respectively, do not include activity.

In some demonstrative embodiments, a wireless communication unit, e.g., wireless communication unit 112 (FIG. 1), may detect a beginning of a BT frame period based on a level of BT_REQ signals 204 and/or 209. Wireless communication unit 112 (FIG. 1) may set anchor point 202 at the offset A from a rise in the level of BT_REQ signals 204 and/or 209, which may be assumed to indicate a beginning of a BT frame period.

As shown in FIGS. 2A and 2B, wireless communication unit 112 (FIG. 1) may set a contention-free period 210 to begin at an anchor point 208, in which a level of BT_REQ signals 204 and/or 209 indicate that no BT activity may be assumed. Wireless communication unit 112 (FIG. 1) may set the contention-free period 210 to end within the BT frame or substantially at the end of the BT frame. Accordingly, contention-free period 210 may have a length of up to roughly the length of one BT frame, e.g., depending on the size of the offset A.

In some demonstrative embodiments, the size of the offset A may be determined to be short enough, for example, to achieve an increased, e.g., maximal, duration of the contention period and/or long enough, for example, to ensure that the value of BT_REQ signal 204 and/or 209 at the anchor point 202 may genuinely reflect the BT activity for the remaining portion of the BT frame. For example, as shown in FIG. 2B, the offset A may allow setting the contention free period 210 after wireless communication unit 114 (FIG. 1) may assert BT_REQ signal 209, when requesting medium access. In other embodiments, the size of the offset A may be determined based on any other suitable additional or different criteria.

In some demonstrative embodiments, synchronizing the contention free period to the BT frame, e.g., as described above, may allow to determine the anchor point, e.g., independently of the type of the BT traffic. Accordingly, the synchronization of the contention free period to the BT frame, e.g., as described above, may be utilized for un-predicted BT traffic. Additionally or alternatively, the synchronization of the contention free period to the BT frame, e.g., as described above, may be relatively simple for implementation.

Referring back to FIG. 1, in some demonstrative embodiments, wireless communication unit 112 may synchronize the at least one contention-free period to an expected activity pattern ("the active profile") of wireless communication unit 114 in wireless communication network 110, e.g., as described below. The active profile of wireless communication unit 114 may be determined by wireless communication unit 112 and/or provided to wireless communication unit by any other element of system 100, e.g., according to any suitable method and/or algorithm.

In some demonstrative embodiments, an expected, e.g., typical, activity pattern of wireless communication unit 114 may be defined based on the active profile. The activity pattern may include, for example, one or more frames ("active frames"), in which actual traffic is communicated in network 110, and one or more frames ("quiet frames"), in which traffic is not communicated over network 110. For example, an SCO link may have a typical activity pattern having a period of three frames including one active frame followed by two quiet frames.

In some demonstrative embodiments, wireless communication unit 112 may determine the expected activity pattern of wireless communication unit 114, for example, based on signal 130. For example, wireless communication unit 112 may determine the active profile of wireless communication unit 114 based on signal 130, and determine the expected activity pattern based on the determined active profile.

In some demonstrative embodiments, wireless communication unit 112 may determine an anchor point corresponding a reference point within the activity pattern. The reference point may be defined, for example, based on the activity pattern. For example, the reference may be defined to include a beginning of the first quiet frame of the SCO activity pattern.

In some demonstrative embodiments, the anchor point may be offset from the reference point by a predefined offset period, e.g., the offset A. The size of offset A may be defined, for example, to account for the possibility, that the rising edge of the BT_REQ signal 130 corresponds to a BT slave frame not followed by an incoming RX frame, e.g., as described above.

In some demonstrative embodiments, wireless communication unit 112 may set the anchor point periodically, for example, at the same periodicity of the activity, e.g., at a periodicity of three BT frames for a SCO activity pattern.

Although some demonstrative embodiments are described herein with reference to a SCO activity pattern, other embodiments may be implemented with respect to any other suitable active profile and/or activity pattern.

Although some demonstrative embodiments are described herein with reference to a relatively simple anchoring pattern including anchoring points defined according to a simple periodic pattern, other embodiments may include any other suitable anchoring pattern, e.g., a relatively complex anchoring pattern including multiple anchor points defined according to any suitable complex and/or regular periodic pattern.

In some demonstrative embodiments, wireless communication unit 112 may set the anchoring pattern such that, for example, the expectance of quiet BT frames is increased, e.g., maximized.

FIGS. 3A and 3B schematically illustrate a synchronization anchor point 202 determined with respect to a BT master activity 301 and a BT slave activity 309, respectively, in accordance with some demonstrative embodiments.

As shown in FIGS. 3A and 3B, BT activities 301 and 309 may be performed according to a BT frame timing 303, which may define a BT slot timing 305. The frame timing 303 may have a repetitive SCO period 320 including a pattern of one active frame followed by two quiet frames.

As shown in FIGS. 3A and 3B, a wireless communication unit, e.g., wireless communication unit 114 (FIG. 1), may provide a BT_REQ signal 304 (FIG. 3A) corresponding to the activity of BT master activity 301 or a BT_REQ signal 311 (FIG. 3B) corresponding to the activity of BT slave activity 309. For example, as shown in FIGS. 3A and 3B, the BT_REQ signals 304 and 309 may be asserted when the BT activities 301 and 309, respectively, include a transmission or a reception activity, and de-asserted when the BT activities 301 and 309, respectively, do not include activity.

In some demonstrative embodiments, a wireless communication unit, e.g., wireless communication unit 112 (FIG. 1), may detect SCO period 320 and set anchor point 302 at the offset A from a beginning of the first quiet frame in each SCO period 320.

As shown in FIGS. 3A and 3B, wireless communication unit 112 (FIG. 1) may set a contention-free period 310 to begin at an anchor point 302, in which a level of BT_REQ signals 304 and/or 309 indicate that no BT activity may be assumed. Wireless communication unit 112 (FIG. 1) may set the contention-free period 310 to end within the SCO period 320 or substantially at the end of SCO period 320. Accordingly, contention-free period 310 may be relatively long, e.g., longer than the length of one BT frame. For example, with respect to the SCO activity of FIGS. 3A and 3B, contention-free period 310 may have the length of approximately two BT frames.

Referring back to FIG. 1, in some demonstrative embodiments, wireless communication unit 112 may transmit, e.g., periodically and/or repeatedly, a plurality of PS POLL frames to AP 104 during the contention free period. For example, wireless communication unit 112 may transmit a first PS POLL frame substantially at the anchor point, and repeat transmitting additional PS Poll frames, e.g., according to any suitable repetition pattern, for example, until a deadline point ("deadline B"), which is offset by a predefined offset ("offset B") from an end of the contention free period.

In some demonstrative embodiments, the offset B may be determined in order to balance the probability of wireless communication unit 112 successfully receiving and acknowledging a frame from AP 104, and/or in order to increase, e.g., maximize, the length of the contention free period. For example, the offset B may include at least a latency period, which may be determined, for example, based on a sum of a transmission time period for transmitting the PS Poll frame, a processing time period required for AP 104 to process the PS Poll frame and a transmission time period corresponding to the transmission of a packet from AP 10 to wireless communication unit 112.

In some demonstrative embodiments, wireless communication unit 112 may perform any additional suitable activity during the contention free period. For example, wireless communication unit 112 may transmit one or more uplink and/or control frames, perform scanning and/or reception operations, and the like, during the contention free period, e.g., between the transmissions of the PS Poll frames.

In some demonstrative embodiments, wireless communication unit 112 may utilize the power save mode and the PS Poll frames to regulate the traffic from AP 104, for example, in order to prevent AP 104 from "blindly" transmitting transmissions to wireless communication unit 112, e.g., during time periods in which wireless communication unit 112 may not be able to properly receive and/or acknowledge the receipt of the transmissions.

Figure 4A:
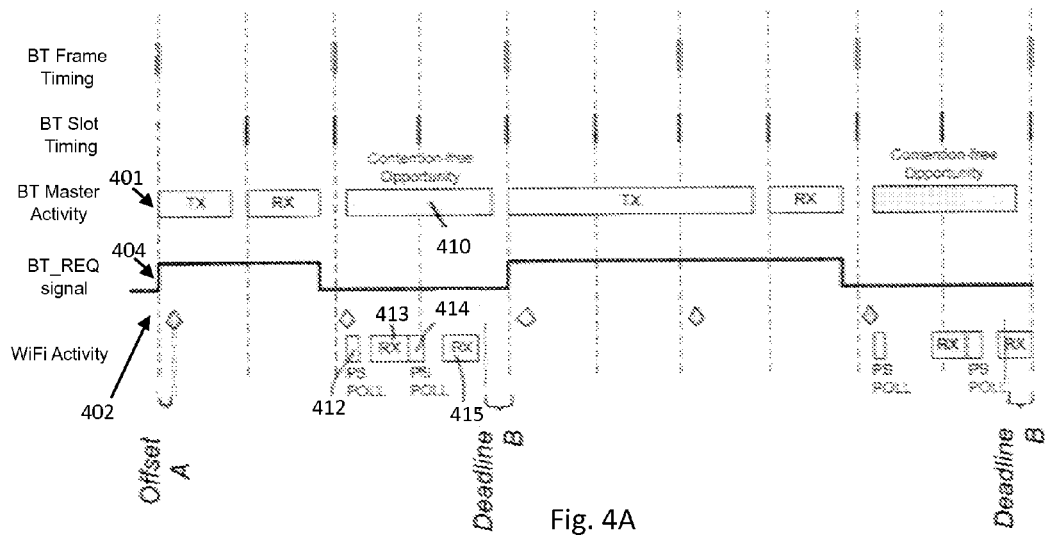
FIGS. 4A and 4B schematically illustrates a Wireless Fidelity (WiFi) activity with respect to a BT master activity and a BT slave activity, respectively, in accordance with some demonstrative embodiments.
Figure 4B:
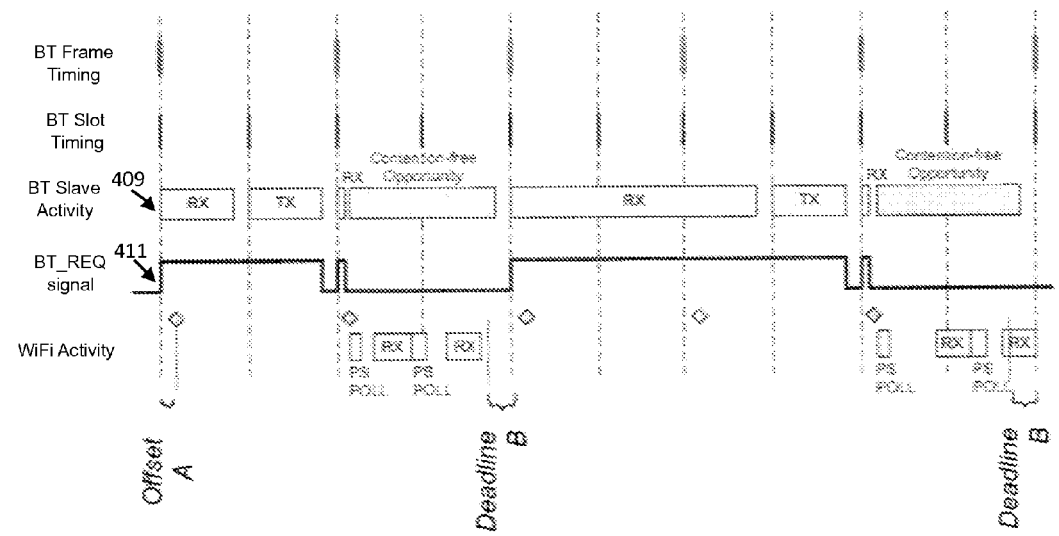

FIGS. 4A and 4B schematically illustrates a WiFi activity 402 with respect to a BT master activity 401 and a BT slave activity 409, respectively, in accordance with some demonstrative embodiments. BT activities 401 and 409 may include, for example, BT activities 201 and 209, respectively, as described above with reference to FIGS. 2A and 2B. WiFi activity 402 may include the communication activity of a wireless communication unit, e.g., wireless communication unit 112 (FIG. 1), over a WiFi communication network, e.g., communication network 108 (FIG. 1).

In some demonstrative embodiments, wireless communication unit 112 (FIG. 1) may determine contention free period 410, e.g., including contention free period 210 as described above with reference to FIGS. 2A and 2B.

As shown in FIGS. 4A and 4B, wireless communication unit 112 (FIG. 1) may transmit a first PS Poll frame 412, for example, upon determining, e.g., based on the level of BT_REQ signals 404 and/or 411, that there is no BT activity at the beginning of contention free period 410. Wireless communication unit 112 (FIG. 1) may receive a transmission 413 from AP 104 (FIG. 1), e.g., in response to frame 412. Wireless communication unit 112 (FIG. 1) may transmit one or more additional PS Poll frames, e.g., PS poll frame 414; and/or receive one or more additional transmissions, e.g., RX transmission 415, for example, until the offset B from the end of contention free period 410.

Figure 5:
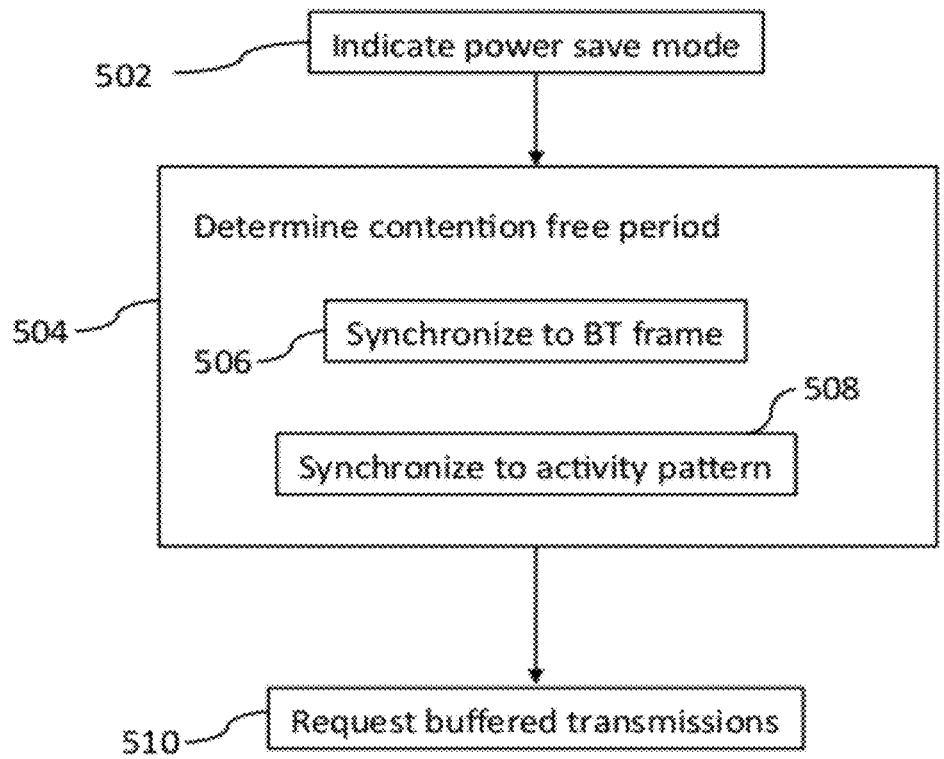
FIG. 5 is a schematic flow-chart illustration of a method of coordinating among multiple collocated wireless communication units, in accordance with some demonstrative embodiments.

Reference is now made to FIG. 5, which schematically illustrates a method of coordinating among multiple collocated wireless communication units, in accordance with some demonstrative embodiments. In some embodiments, one or more operations of the method of FIG. 5 may be performed by one or more elements of a system, e.g., system 100 (FIG. 1), for example, a wireless communication device, e.g., device 102 (FIG. 1), and/or a wireless communication unit, e.g., wireless communication unit 112 (FIG. 1).

As indicated at block 502, the method may include transmitting from a first wireless communication unit an indication of a power-save mode, in which an access point of a first wireless communication network is to buffer transmissions to be transmitted to the first wireless communication unit. For example, wireless communication unit 112 (FIG. 1) may indicate a power-save mode to AP 104 (FIG. 1), e.g., as described above.

As indicated at block 502, the method may include determining at least one contention-free period, during which a second wireless communication unit, co-located with the first wireless communication unit, is expected not to communicate in a second wireless communication network. For example, wireless communication unit 112 (FIG. 1) may determine a contention free period based on signal 130 (FIG. 1), e.g., as described above.

As indicated at block 506, determining the at least one contention-free period may include determining at least one contention-free period within a frame period, e.g., a BT frame period, corresponding to a transmission of a frame in the second wireless communication network. For example, wireless communication unit 112 (FIG. 1) may synchronize the contention free period to a BT frame timing, e.g., as described above.

As indicated at block 508, determining the at least one contention-free period may include synchronizing the at least one contention-free period to an expected activity pattern of the second wireless communication unit in the second wireless communication network. For example, wireless communication unit 112 (FIG. 1) may synchronize the contention free period to an expected BT activity pattern, e.g., as described above.

As indicated at block 510, the method may include, during the contention-free period, transmitting from the first wireless communication unit to the access point at least one request to transmit the buffered transmissions. For example, wireless communication unit 112 (FIG. 1) may transmit one or more PS Poll frames to AP 104 (FIG. 1), e.g., as described above.

Figure 6:
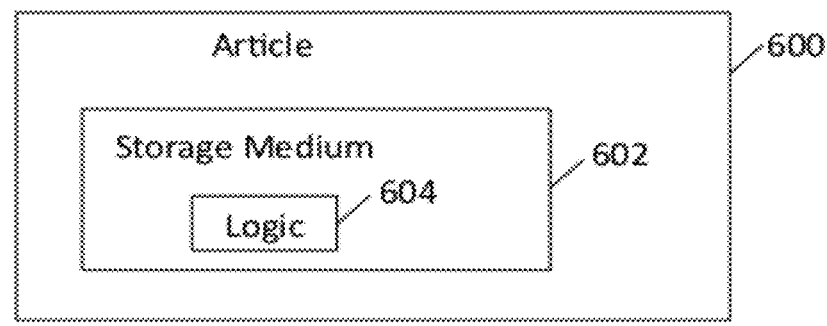
FIG. 6 is a schematic illustration of an article of manufacture, in accordance with some demonstrative embodiments.

Reference is made to FIG. 6, which schematically illustrates an article of manufacture 600, in accordance with some demonstrative embodiments. Article 600 may include a machine-readable storage medium 602 to store logic 604, which may be used, for example, to perform at least part of the functionality of wireless communication unit 107 (FIG. 1) and/or wireless communication unit 118 (FIG. 1), and/or to perform one or more operations of the method of FIG. 2.

In some embodiments, article 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication device including:
    a first wireless communication unit to communicate with an access point of a first wireless communication network; and
    a second wireless communication unit to communicate in a second wireless communication network,
    wherein the first wireless communication unit is to determine at least one contention-free period, during which the second wireless communication unit is expected not to communicate in the second wireless communication network, said first wireless communication unit is to monitor a signal from the second wireless communication unit, to set a point within a slot of the second wireless communication network at a predefined non-zero time period after a beginning of a slot boundary of the slot, and to determine said contention-free period to begin at the point, if the momentary level of the signal at the point is de-asserted; and
    wherein, during the contention-free period, the first wireless communication unit is to transmit to the access point at least one request to transmit one or more pending transmissions to the first wireless communication unit.

2. The wireless communication device of claim 1, wherein the first wireless communication unit is to indicate a power save mode to the access point, and wherein the at least one request includes at least one power-save poll frame.

3. The wireless communication device of claim 1, wherein the first wireless communication unit is to detect a frame period corresponding to a transmission of a frame in the second wireless communication network, and wherein the first wireless communication unit is to determine the contention-free period to be within the frame period.

4. The wireless communication device of claim 3, wherein the first wireless communication unit is to set said point at said predefined time after a beginning of the frame period.

5. The wireless communication device of claim 3, wherein the first wireless communication unit is to determine the contention-free period to end a predefined time period prior to an end of the frame period.

6. The wireless communication device of claim 1, wherein the first wireless communication unit is to synchronize the at least one contention-free period to an expected activity pattern of the second wireless communication unit in the second wireless communication network.

7. The wireless communication device of claim 6, wherein a length of the contention-free period is greater than a length of a frame period corresponding to a transmission of a frame in the second wireless communication network.

8. The wireless communication device of claim 7, wherein the length of the contention-free period is at least double the length of the frame period.

9. The wireless communication device of claim 1, wherein the signal from the second wireless communication unit includes a Bluetooth-request signal.

10. The wireless communication device of claim 1, wherein the first wireless communication network includes a wireless-fidelity network and wherein the second wireless communication network includes a Bluetooth network.

11. A wireless communication system including:
    a wireless communication device including:
        at least one antenna;
        a first wireless communication unit to communicate with an access point of a first wireless network according to a power-save mechanism, in which the access point is to buffer transmissions to be transmitted to the first wireless communication unit; and
        a second wireless communication unit to communicate in a second wireless communication network,
        wherein the first wireless communication unit is to monitor a signal from the second wireless communication unit, to detect an activity pattern, which includes one or more quiet frames, of the second wireless communication network, to set a point at a predefined non-zero time period after a beginning of a quiet frame of said quiet frames, to determine at least one contention-free period to begin at the point, based on a momentary level of the signal at the point, and to transmit to the access point at least one request to transmit the buffered transmissions during said contention-free period.

12. The wireless communication system of claim 11, wherein the first wireless communication unit is to indicate a power save mode to the access point, and wherein the at least one request includes at least one power-save poll frame.

13. The wireless communication system of claim 11, wherein the first wireless communication unit is to detect a frame period corresponding to a transmission of a frame in the second wireless communication network, and wherein the first wireless communication unit is to determine the contention-free period to be within the frame period.

14. The wireless communication system of claim 11, wherein a length of the contention-free period is greater than a length of a frame period corresponding to a transmission of a frame in the second wireless communication network.

15. The wireless communication system of claim 11, wherein the first wireless communication unit is determine said contention-free period to begin at the point, only if the momentary level of said signal at the point is de-asserted.

16. A method including:
transmitting from a first wireless communication unit an indication of a power-save mode, in which an access point of a first wireless communication network is to buffer transmissions to be transmitted to the first wireless communication unit;
monitoring a signal from a second wireless communication unit, co-located with the first wireless communication unit, communicating in a second wireless communication network;
setting a point within a slot of the second wireless communication network at a predefined non-zero time period after a beginning of a slot boundary of said slot;
determining at least one contention-free period, during which said second wireless communication unit is expected not to communicate in said second wireless communication network, wherein said determining includes determining said contention-free period to begin at the point, based on the momentary level of the signal at the point; and
during the contention-free period, transmitting from the first wireless communication unit to the access point at least one request to transmit the buffered transmissions.

17. The method of claim 16, wherein determining the at least one contention-free period includes determining at least one contention-free period within a frame period corresponding to a transmission of a frame in the second wireless communication network.

18. The method of claim 16 including synchronizing the at least one contention-free period to an expected activity pattern of the second wireless communication unit in the second wireless communication network.

19. The method of claim 16, wherein said determining includes determining said contention-free period to begin at the point, only if the momentary level of the signal at the point is de-asserted.

* * * * *

UNITED STATES PATENT AND TRADEMARK OFFICE
CERTIFICATE OF CORRECTION

| | | |
|---|---|---|
| PATENT NO. | : 8,570,964 B2 | Page 1 of 1 |
| APPLICATION NO. | : 12/945939 | |
| DATED | : October 29, 2013 | |
| INVENTOR(S) | : Eran Sudak et al. | |

It is certified that error appears in the above-identified patent and that said Letters Patent is hereby corrected as shown below:

On the title page, in Item (56), in column 2, under "Other Publications", line 11, below "2012, 9 pages." insert -- "International Preliminary Report on Patentability for PCT Patent Application No. PCT/US2011/058825, mailed on May 30, 2013, 7 pages. --.

Signed and Sealed this
Eighth Day of April, 2014

Michelle K. Lee
*Deputy Director of the United States Patent and Trademark Office*